Oct. 19, 1954  J. J. RANDO  2,692,143
VEHICLE PARKING MEANS
Filed Aug. 13, 1951  3 Sheets-Sheet 1
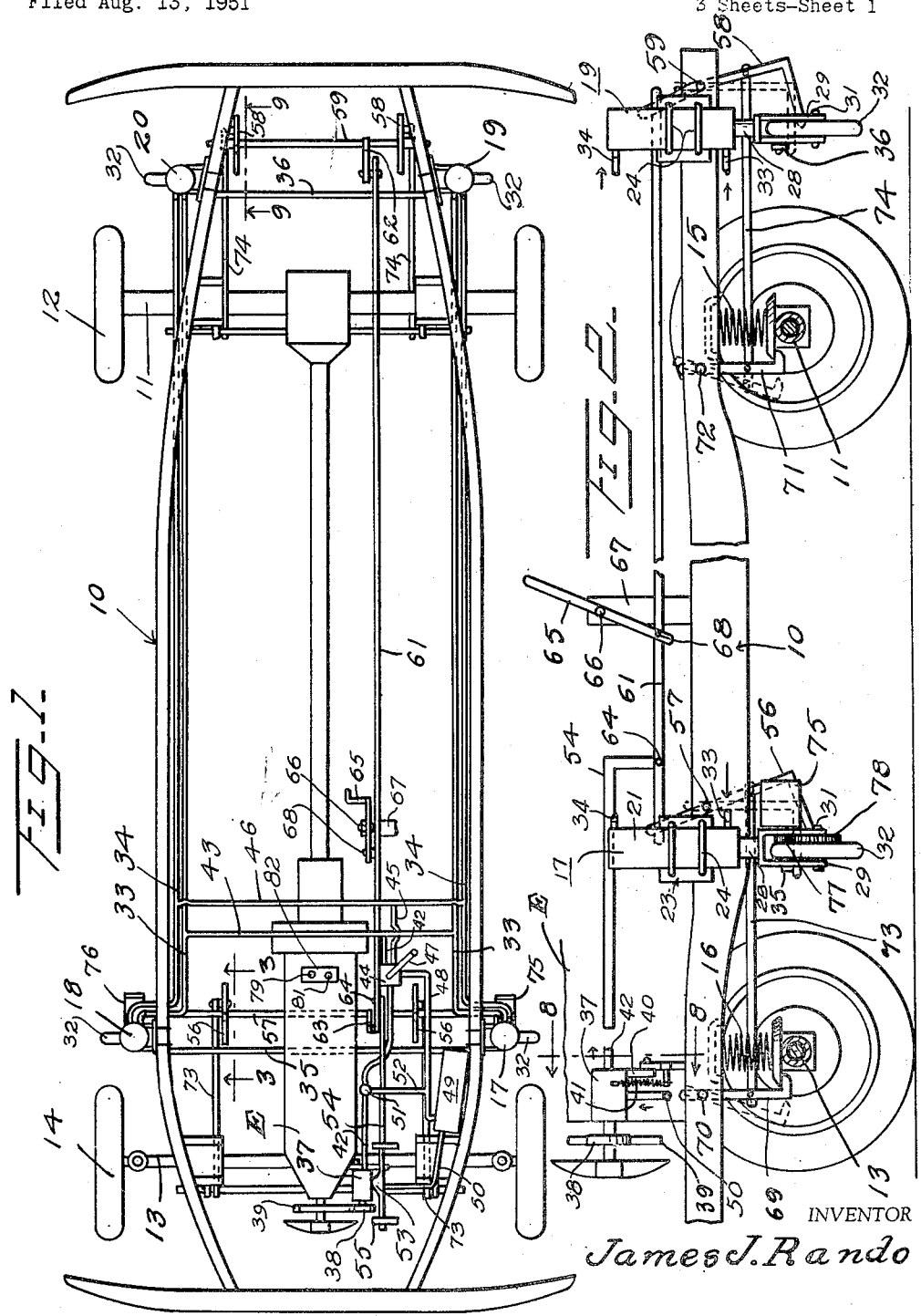
INVENTOR
James J. Rando
BY Kimmel & Crowell
ATTORNEYS

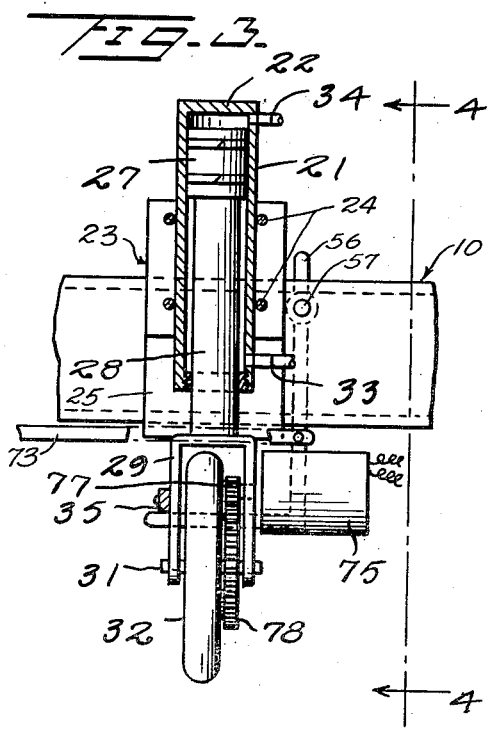
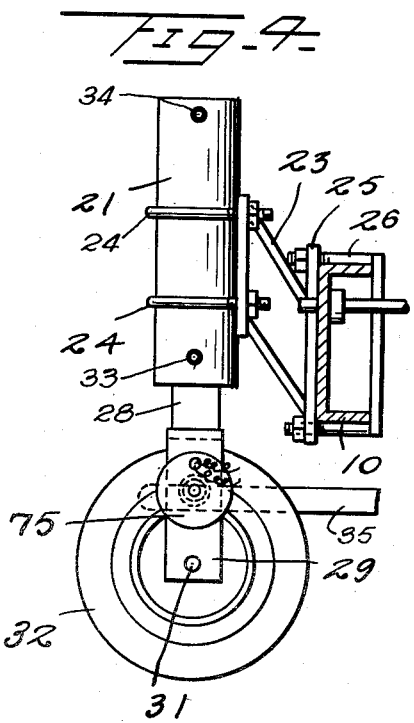
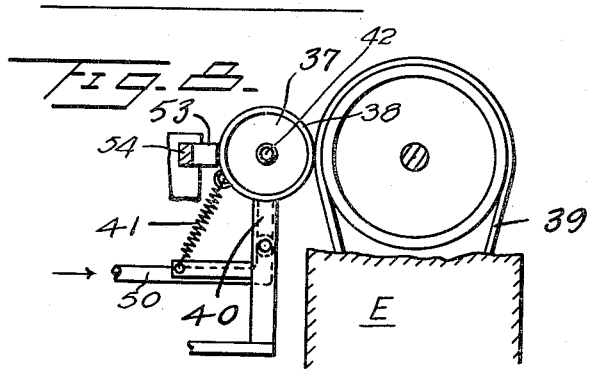
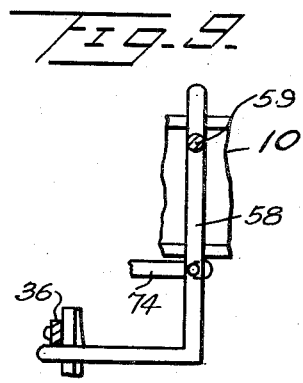

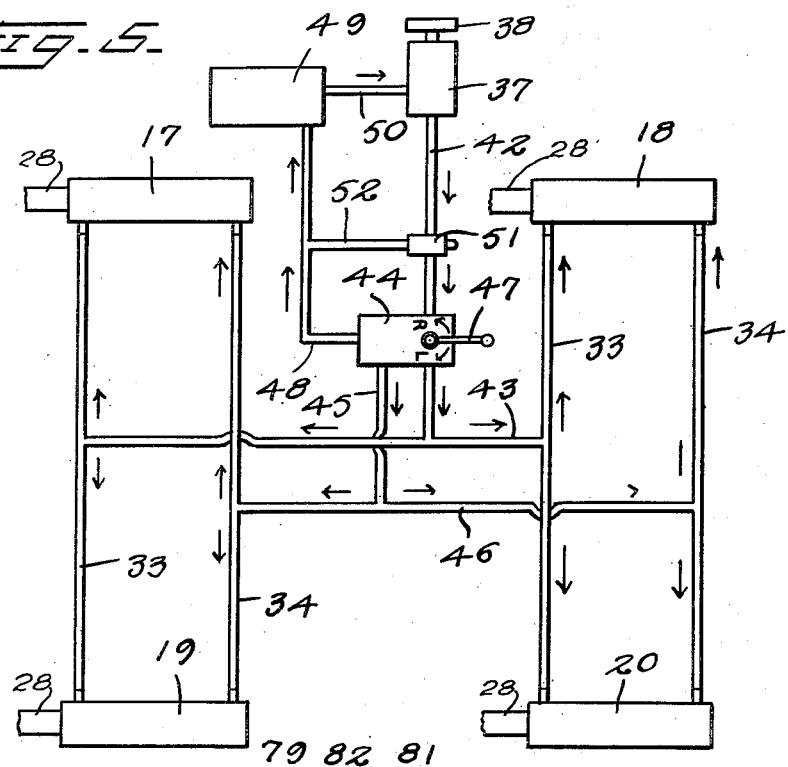
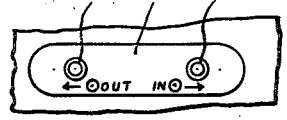
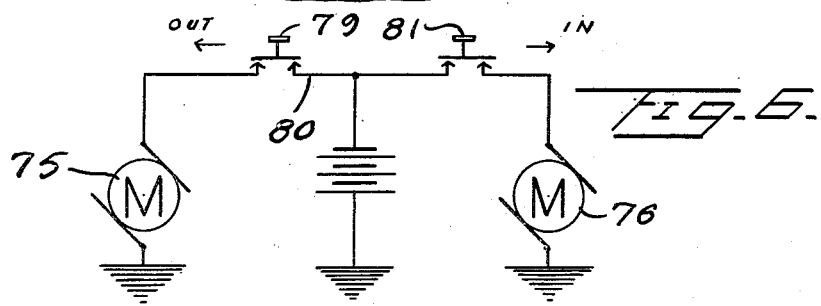

Patented Oct. 19, 1954

2,692,143

UNITED STATES PATENT OFFICE 2,692,143

VEHICLE PARKING MEANS

James J. Rando, Atlantic City, N. J.

Application August 13, 1951, Serial No. 241,653

1 Claim. (Cl. 280—150)

This invention relates to a vehicle parking means.

An object of this invention is to provide an attachment for mounting on a vehicle whereby the vehicle may be parked in a space only slightly greater than the length of the vehicle and within which the vehicle could not ordinarily be disposed.

Another object of this invention is to provide a hydraulic jack adjacent each wheel of the vehicle, with all of the jacks interconnected for simultaneous operation, and each jack has a wheel mounted on the lower end thereof which is disposed at right angles to the vehicle wheels so that the vehicle can move laterally of the length thereof.

A further object of this invention is to provide an attachment of this kind including a central control means and an auxiliary pump which is adapted to be operated from the engine.

A further object of this invention is to provide an attachment of this kind including a safety means which will lock the hydraulic jacks against operation when the vehicle is in normal operation, and for locking the wheel axles to the vehicle frame when the jacks are operative.

A further object of this invention is to provide power means connected with certain of the jack wheels on each side of the vehicle so that the vehicle may be shifted laterally into or out of the parking space.

A further object of this invention is to provide a pressure relief valve in the pressure side of the pump so as to bypass the liquid to the reservoir when the pressure exceeds a predetermined amount.

With the above and other objects in view, my invention consists in the arrangement, combination and details of construction disclosed in the drawings and specification, and then more particularly pointed out in the appended claims.

In the drawings,

Figure 1 is a plan view of a vehicle frame structure having a parking means constructed according to an embodiment of this invention mounted thereon, Figure 2 is a longitudinal section, partly broken away, of the vehicle frame, Figure 3 is a vertical section of one of the jack members taken on the line 3—3 of Figure 1, Figure 4 is a sectional view taken on the line 4—4 of Figure 3, Figure 5 is a diagrammatic view of the liquid circuit, Figure 6 is a diagrammatic view of the electric circuit, Figure 7 is a front elevation of the electric control panel, Figure 8 is a fragmentary sectional view taken on the line 8—8 of Figure 2, Figure 9 is a fragmentary sectional view taken on the line 9—9 of Figure 1.

Referring to the drawings, the numeral 10 designates generally a conventional vehicle frame structure having a rear axle 11 on which wheels 12 are mounted, and also having a front axle 13 on which wheels 14 are mounted. The vehicle frame 10 is cushioned relative to the axles 11 and 13 by means of springs 15 and 16.

A front pair of hydraulic jack members 17 and 18 are secured to the opposite sides of the frame 10 rearwardly of the front wheels 14, and a rear pair of hydraulic jack members 19 and 20 are secured to the frame 10 rearwardly of the rear wheels 12. The jack members 17 to 20 inclusive are of like construction and are secured to the frame 10 by like securing means.

Each jack member comprises a vertically disposed cylinder 21 having an upper head 22, and the cylinder 21 is secured to a bracket means 23 by means of a pair of U-bolts 24. The bracket 23 includes a vertically-disposed base plate 25 secured by fastening means 26 to the frame 10. A piston or plunger 27 is slidable within the cylinder 21 and includes an elongated downwardly extending piston rod 28 having a fork 29 on the lower end thereof.

A wheel 32 is journalled on a shaft 31 extending between the arms of the fork 29. The cylinder 21 has a lower pressure line 33 connected with the lower portion thereof, and also has an upper pressure line 34 connected with the upper portion thereof. The two pressure lines 33 and 34 provide means whereby the piston 27 may be positively moved upwardly or downwardly to retract or extend the jack member.

The forks of the two front jack members 17 and 18 are connected together by means of a tie rod 35, and the forks of the rear jack members 19 and 20 are connected together by means of a rear tie rod 36. These tie rods 35 and 36 provide a means whereby the wheels 32 will be held at right angles to the length of the frame 10, the purpose for which will be hereinafter described.

The pressure lines 33 on the same side of the vehicle are connected between the front and rear jack members, and in like manner the upper pressure lines 34 on the same side of the vehicle are connected with the jack members on that side of the vehicle.

A fluid pump 37 is disposed adjacent the forward end of the engine E in a position whereby drive plate 38 of the pump 37 bears against the outer surface of engine fan belt 39. Preferably the pump 37 is rockably supported on a supporting member 40 and is constantly urged away from the fan belt 39 by means of a spring 41. The pressure side of the pump 37 has a pipe 42 connected therewith, and the pipe 42 is connected to a cross pipe 43 which is connected between the two lower lines 33.

A regulating valve 44 of conventional construction is interposed in the pipe 42 and has an outlet pipe 45 connected therewith which is connected to a cross pipe 46 which is connected between the pressure lines 34. The valve 44 includes a valve operating lever 47 which upon rocking thereof is adapted to regulate the flow of the fluid to either the lower pressure lines 33, or the upper pressure lines 34.

A return pipe 48 is connected with the valve 44 and is also connected to a fluid reservoir 49. The fluid reservoir 49 is connected to the intake side of the pump 37 by means of a pipe 50. A safety or bypass valve 51 is interposed in the pipe 42 between the pump 37 and the valve 44 and is also connected by means of a pipe 52 to the return line 48. The pump 37 is adapted to be moved inwardly toward the belt 39 by means of a cam 53 which is carried by an elongated slide rod 54 slidably mounted in guides 55, Figures 1 and 3.

A front pair of L-shaped locking levers 56 are rockably mounted on pivots 57 and the lower side of each lever 56 is adapted, when lever 56 is in locking position, to engage beneath the front tie rod 35. A rear pair of L-shaped locking levers 58 are rockably mounted on pivots 59 and are adapted, when in operative position, to engage beneath the rear tie rod 36. These locking levers 56 and 58 are adapted to prevent accidental extending of the jack members when the vehicle is in normal operation.

The pivots 57 and 59 comprise cross shafts and provide means whereby the front and rear locking levers may be operated each as a unit. An elongated control rod 61 extends lengthwise of the frame 10 and is connected at its rear end to a lever 62 which is fixed on the shaft 59, and is connected at its forward end to a lever 63 fixed on the shaft 57. The rear end of the cam carrying rod 54 is pivotally connected as at 64 to the control rod 61.

A regulating lever 65 pivotally mounted as at 66 on a support 67 is pivotally connected as at 68 with the control rod 61, Figures 1 and 2.

In order to provide a means whereby the springs 15 and 16 will be held against relaxing or expanding at the time the jacks are extended, I have provided a front pair of spring locking hooks 69 pivotally mounted as at 70, on the frame 10, and a rear pair of hooks 71 are pivotally mounted as at 72 on the frame 10. The hooks 69 are oppositely disposed with respect to the hooks 56 and are connected with the latter by means of links 73. The hooks 71 are also oppositely disposed with respect to the hooks 58 and are connected with the latter by means of links 74. By means of the opposite arrangement of the locking hooks hereinbefore described, when the hooks 56 and 58 are in locking position with respect to the tie rods 35 and 36, the hooks 69 and 71 are in released position with respect to the springs 16 and 15 respectively. Also when it is desired to extend the jack members and lever 65 is rocked rearwardly at its upper end locking hooks 56 and 58 will be swung rearwardly to disengaged position with respect to the tie rods 35 and 36 and at the same time the spring locking hooks 69 and 71 will be swung rearwardly to a locking position with respect to the springs 16 and 15 respectively.

In order to provide a means whereby the vehicle may be shifted laterally of the normal line of travel into a parking space, the wheels of the front jacks 17 and 18 are connected each with an electric motor 75 and 76 respectively. The motor shaft has a small gear member 77 mounted thereon which engages a large gear 78 which is fixed relative to a jack wheel 32. The motors 75 and 76 are adapted to be operative in reverse so that one of these motors will move the vehicle in one direction and the other motor will move the vehicle in the opposite direction.

There is a separate electric circuit for each motor 75 and 76 as shown in Figure 6, with a manually operable spring-pressed switch 79 interposed in the circuit 80. The switch 79 is spring-pressed to an open position so that normally each switch will be in circuit breaking position. The motor 76 is energized by closing of a switch 81 and as shown in Figure 7, a relatively small panel 82 is mounted adjacent to or on the dash of the vehicle so as to be in a convenient position to the driver of the vehicle.

In the use and operation of this invention, the jack members 17 and 18 are mounted on the frame 10 rearwardly of the front wheels 14, and the rear jack members 19 and 20 are mounted on the frame 10 rearwardly of the rear wheels 12. The pump 37 is supported adjacent the fan belt 39 so that the pump may be manually moved inwardly to operating position when cam 53 is moved lengthwise of the frame 10. During the normal operation of the vehicle the jack locking levers 56 and 58 will be disposed in the dotted line position shown in Figure 2, engaged beneath the tie bars or rods 35 and 36. Spring locking hooks 69 and 71 will at this time be disposed in their released position, as shown in dotted lines in Figure 2. When it is desired to shift the vehicle laterally into a relatively small parking space within which the vehicle could not normally be parked, the jack members 17 to 20 inclusive are extended and at this time lever 65 will be disposed into the position shown in Figure 2. Locking levers 56 and 58 will be swung rearwardly to released position and simultaneously spring locking levers or hooks 69 and 71 will be swung rearwardly to the full line position shown in Figure 2, whereby the springs 16 and 15 respectively will be held against expanding or relaxing.

Operation of the valve control lever 47 will connect upper pressure lines 34 with the pressure line 42 so that the pistons 27 of the jack members will be forced downwardly. When the vehicle wheels 12 and 14 are elevated or disengaged from the road, motor 76 may be energized so as to laterally shift the vehicle into the parking space. The vehicle may be moved out of the parking space by energizing motor 75. The parking means hereinbefore described can be readily attached to the vehicle frame without alteration of any of the parts of the frame, and when in position the parking means will provide an effective means for permitting the vehicle to be moved into a parking space which is only slightly longer than the length of the vehicle.

I do not mean to confine myself to the exact details of construction herein disclosed, but claim all variations falling within the purview of the appended claim.

What I claim is:

In combination, a vehicle frame, wheel-supporting front and rear axles connected to said frame, vehicle springs connected to said axles and said vehicle frame, a plurality of parking jack members arranged in pairs with one pair being mounted on the front end of the frame and the other pair being mounted on the rear end of the frame, means for simultaneously extending all of said jack members, a wheel carried by the movable portion of each jack member, said wheels being engageable with the road surface when said jack members are extended, a transverse tie bar connected to the movable portion of each of said jack members of each pair, locking levers pivotally secured to said vehicle frame, each of said locking levers having an end engageable beneath each of said tie bars for holding said jack members in their retracted positions against accidental extension thereof, vehicle spring locking levers pivotally secured to the vehicle frame, each of said vehicle spring locking levers having an end engageable with said springs beneath said axles to lock said springs against relaxing, linkage means pivotally connecting one of each of said first levers with an adjacent vehicle spring lever, said linkage means being connected to said first levers and said vehicle spring levers intermediate their respective pivotal connections and their said associated ends and having a length greater than the distance between said springs and said tie bar to retain said first levers in engagement with said movable portion of said jacks while simultaneously disengaging said second levers from said springs, said first and second levers being operable independently of the movement of said wheels carried by said movable portions of said jacks, and operating means pivotally connected to the other ends of said tie bar locking levers to operate the same in unison whereby said tie bar locking levers simultaneously actuate the associated vehicle spring levers through said linkage means.

References Cited in the file of this patent

UNITED STATES PATENTS

| Number | Name | Date |
|---|---|---|
| 1,742,636 | Collins | Jan. 7, 1930 |
| 1,772,716 | Hall | Aug. 12, 1930 |
| 1,884,932 | Walker | Oct. 25, 1932 |
| 1,890,716 | Andreasen et al. | Dec. 13, 1932 |
| 1,914,643 | McCann | June 20, 1933 |
| 2,002,132 | Wolfe | May 21, 1935 |
| 2,090,768 | Thomas | Aug. 24, 1937 |
| 2,175,776 | Jeremiah | Oct. 10, 1939 |

FOREIGN PATENTS

| Number | Country | Date |
|---|---|---|
| 661,905 | France | Mar. 12, 1929 |